Fig. 2.

Inventor:
James C. French
Arthur F. Amand
By           Atty.

J. C. FRENCH.
COMBINED TRENCH MACHINE AND OPEN DITCH EXCAVATOR.
APPLICATION FILED JULY 8, 1915.

1,280,701.

Patented Oct. 8, 1918.
9 SHEETS—SHEET 7.

Witnesses:

Inventor:
James C. French
By Arthur F. Durand
Atty.

UNITED STATES PATENT OFFICE.

JAMES C. FRENCH, OF KENOSHA, WISCONSIN, ASSIGNOR TO FREDERICK C. AUSTIN, OF CHICAGO, ILLINOIS.

COMBINED TRENCH-MACHINE AND OPEN-DITCH EXCAVATOR.

1,280,701.  Specification of Letters Patent.  Patented Oct. 8, 1918.

Application filed July 8, 1915. Serial No. 38,654.

*To all whom it may concern:*

Be it known that I, JAMES C. FRENCH, a citizen of the United States of America, and resident of 772 Grant street, Kenosha, Wisconsin, where I am now living and receive mail, have invented a certain new and useful Improvement in Combined Trench-Machines and Open-Ditch Excavators, of which the following is a specification.

My invention relates to excavators of that kind in which an endless series of buckets is carried on a digging beam located at the rear end of the machine, and in which means are provided for oscillating said beam and bucket from side to side during the operation of the machine, whereby the said buckets not only have a forward cutting action to form a trench, but also have a lateral digging action which serves to widen the trench, thereby producing a ditch which is much wider than the buckets.

In certain respects, therefore, my invention is in the nature of an improvement on the machine shown in my prior application No. 16,302, filed March 22, 1915, and to which this application is subordinate, as in said prior application I have claimed my invention broadly, whereas in this application I have claimed the combinations and features of construction which are not shown in said prior application.

The object of my invention, as herein disclosed, is to provide a machine of this kind in which the said digging beam not only has a to-and-fro sidewise motion or oscillation while the machine is moving forward, and while the said buckets are in operation, but also has an up and down movement to properly shape the sides of the ditch, as will hereinafter more fully appear.

It is also an object to provide certain details and features of construction and combinations tending to increase the general efficiency of an oscillating trench machine of this particular character.

To these and other useful ends, my invention consists in matters hereinafter set forth and claimed.

In the accompanying drawings—

Fig. 2 is a plan of the machine shown in Fig. 1.

Figure 1:
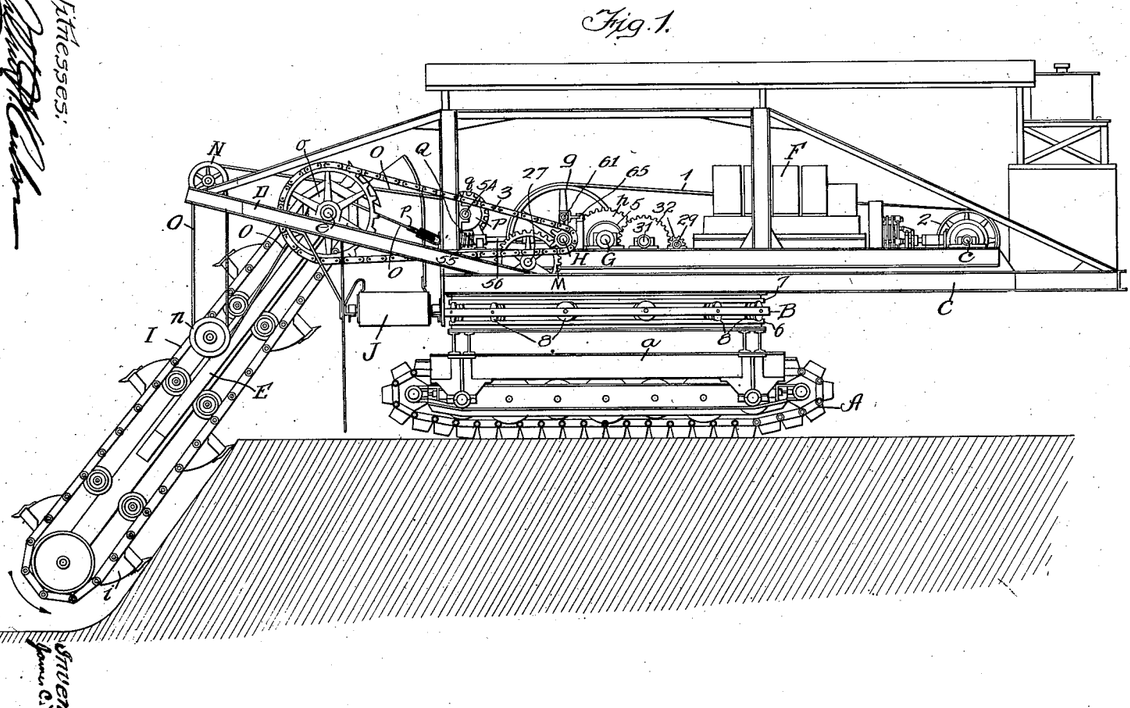
Figure 1 is a side elevation of an oscillating trench machine embodying the principles of my invention.
Figures 3, 4, 5:
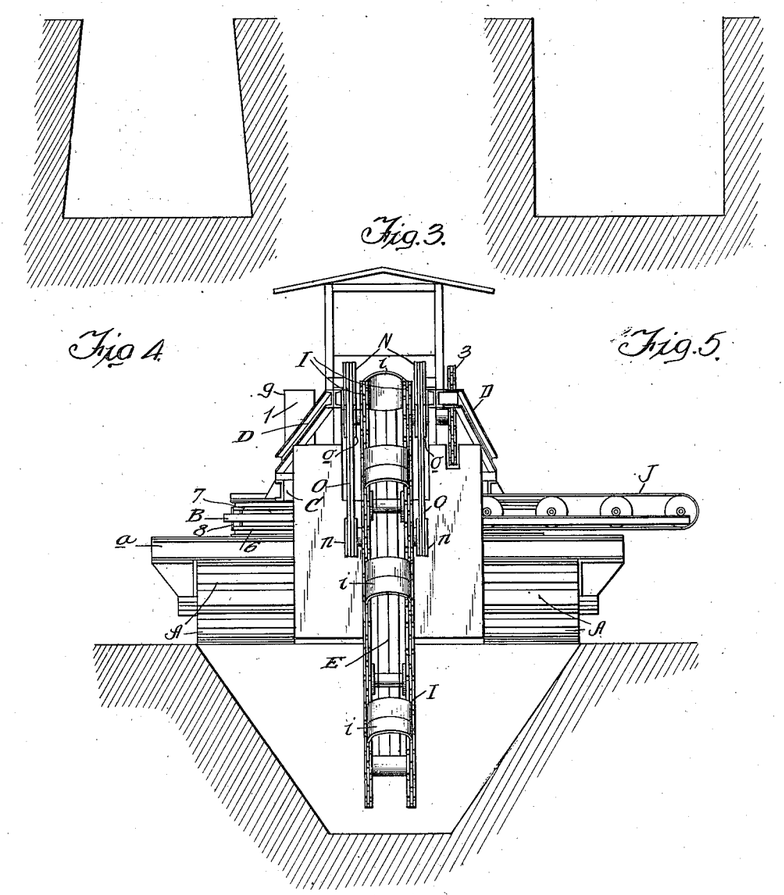
Fig. 3 is a rear end elevation of the said machine, showing the ditch with sloping banks formed as the result of the combined up and down and sidewise movement of the digging beam during the operation of the buckets.
Fig. 4 is a diagrammatic or cross sectional view of a hypothetical form of trench, showing the undercut or overhanging banks or sides which would result from dispensing with the up and down movement of the digging beam, and which would be produced by using only the lateral movement of the digging beam during the operation of the buckets.
Fig. 5 is a similar view illustrating the form of trench which will be produced by so regulating or controlling the sidewise and up and down movement of the digging beam that the sides of the trench are exactly vertical.
Figure 6:
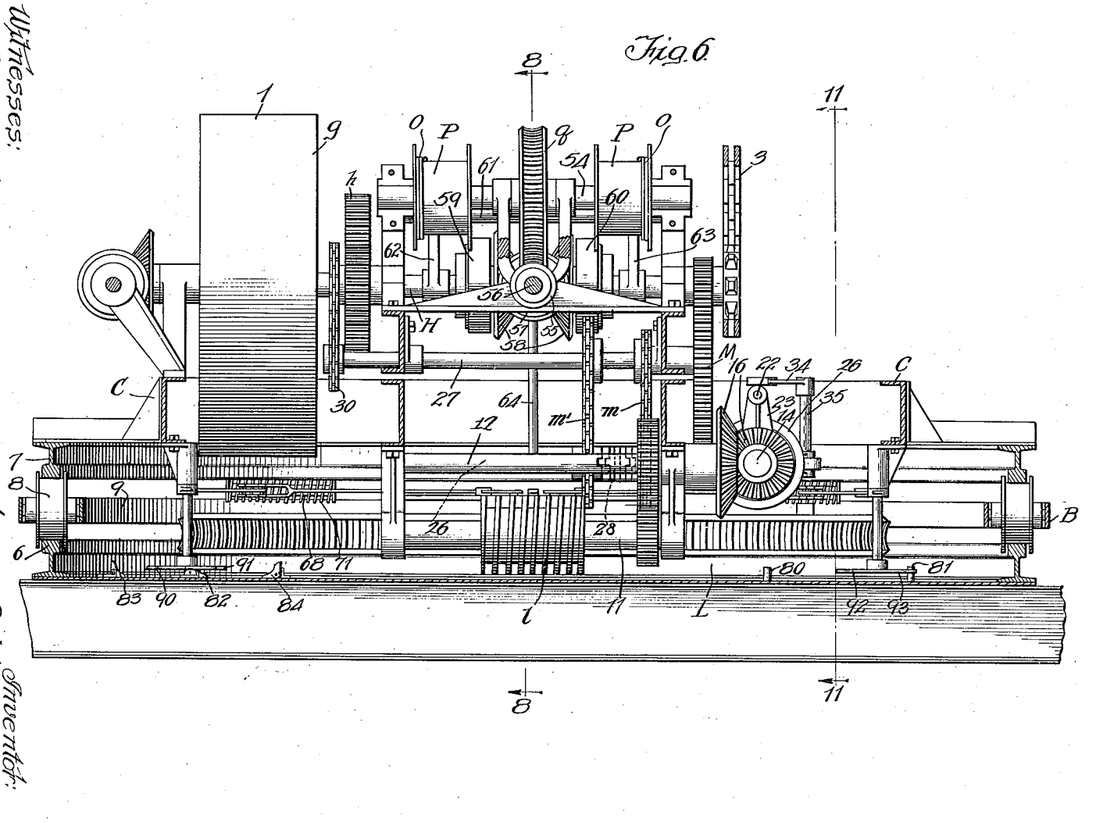
Fig. 6 is an enlarged cross section on line 6—6 in Fig. 2.
Figure 7:
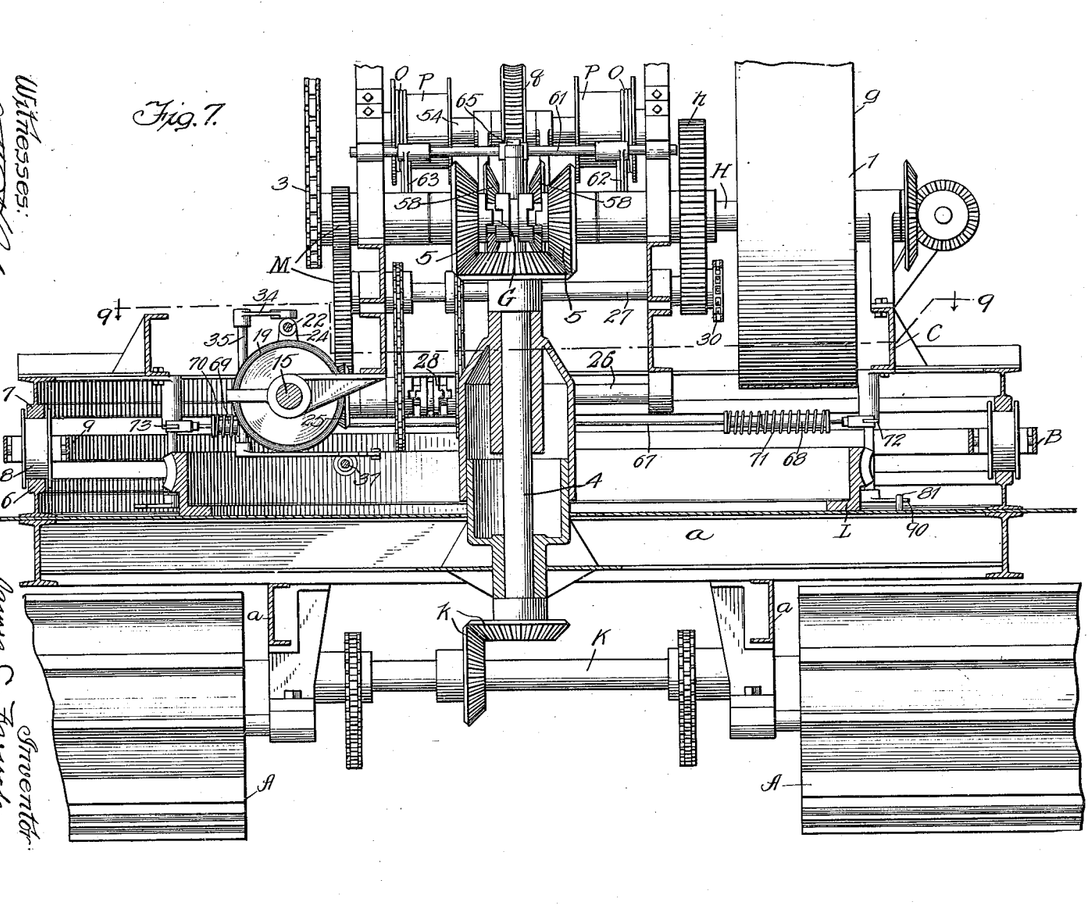
Fig. 7 is an enlarged cross section on line 7—7 in Fig. 2.
Figure 8:
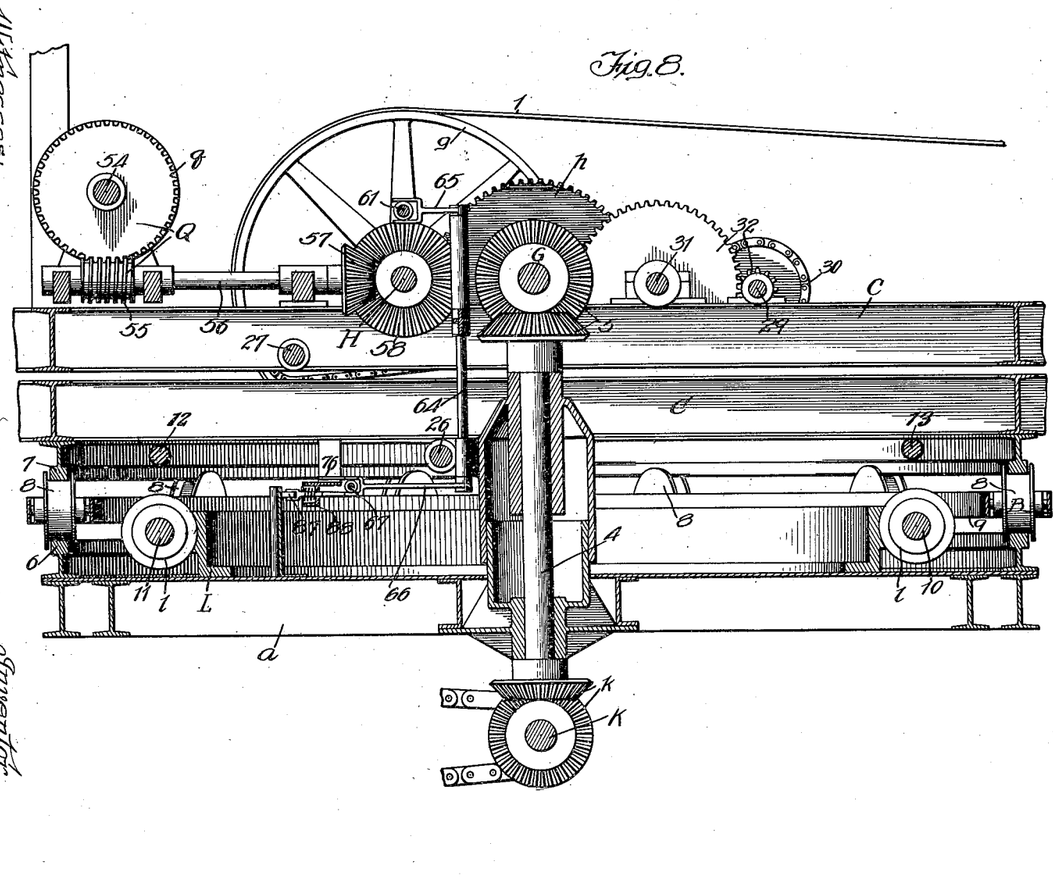
Fig. 8 is a vertical section on line 8—8 in Fig. 6.
Figure 9:
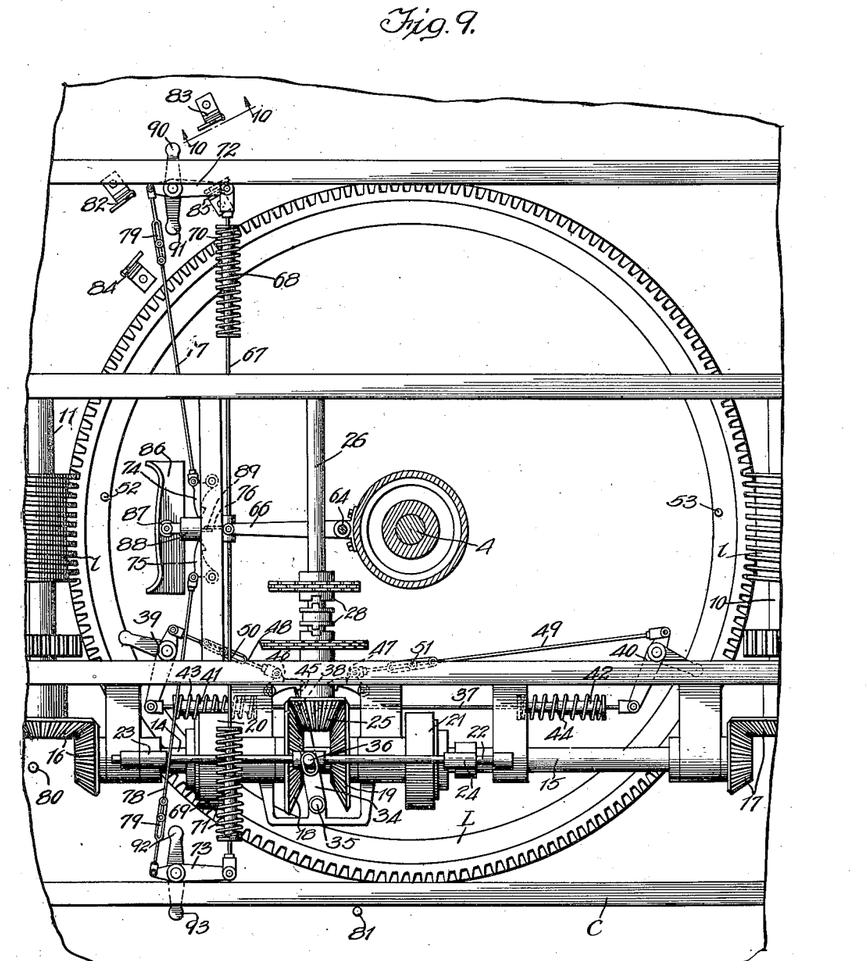
Fig. 9 is a horizontal section on line 9—9 in Fig. 7.

As thus illustrated, and referring to Figs. 1, 2 and 3, the general construction of my invention is as follows: A caterpillar or other traction device A is provided with a frame a for supporting a turn-table B, and the main frame or body C of the machine is supported on said turn-table, whereby said body is capable of oscillation about a vertical axis. A frame D extends rearward from the said body C, and the digging beam E is supported by the shaft e mounted in suitable bearings on said frame, whereby said digging beam hangs downward at the rear end of the machine and is capable of up and down swinging motion about a horizontal and transverse axis coincident with said shaft. An engine F is mounted on the body C, in a position toward the forward end thereof, and is suitably connected for operating the transverse shaft c at the forward end of the body. Toward the rear of said body, and directly over the center of the turn-table B, a shaft G is mounted in suitable bearings on the body. A transverse shaft H is also mounted on the body C in suitable bearings, has a pulley g connected by a belt, with the pulley 2 on the shaft c, and is connected by gearing h with the shaft G, the said shaft H being provided with a sprocket at the other end thereof. This sprocket, which may be of any suitable character, is connected by a sprocket chain 3 with the larger sprocket shown at the end of the shaft e, whereby the latter is suitably driven. Other sprockets, of any suitable character, are also mounted upon the shaft e, and similar sprockets are provided at the lower end of the digging beam E, these upper and lower sprockets being connected by link belts I of any suitable character. The digging buckets i are suitably secured to said link belts or sprocket chains I, and each bucket is adapted to discharge its load when it reaches the upper end of the digging beam, the discharge being from the rear end of each bucket. A conveyer J, of any suitable character, extends transversely at the rear end of the body C, and in position to receive the successive discharges from the upwardly traveling buckets, whereby the excavated dirt is finally discharged at one side of the machine. Ordinarily, and with a construction of the foregoing general character, the continuously traveling buckets i would cut a trench with vertical sides as the machine moves slowly forward, it being understood that the shaft G is connected with the caterpillar A to enable the power of the engine F to be utilized for propelling the machine. As shown in Fig. 7, the shaft K which operates the caterpillar, or other traction device, is connected by bevel gearing k with the lower end of a vertical shaft 4, the upper end of which latter is connected by reversing gearing 5, of any suitable character, with the shaft G which is driven by the engine. Thus, and by means of the power transmitting connection thus provided, the machine can be propelled in either direction. As stated, the forward motion of the machine, while the digging beam E and buckets i are in the ground, would ordinarily produce a narrow trench having vertical sides.

With my improved construction, however, the body C oscillates about a vertical axis coincident with the shaft 4, while the machine is moving ahead and during the operation of the buckets i, and consequently the said continuously operated buckets are crowded first against one side of the ditch and then against the other, thereby widening the ditch to the desired extent. This lateral movement, without some provision to the contrary, would result in a trench of the kind shown in Fig. 4, as the slant or angle of the digging beam E, when shifted to one side, would cause the buckets to undercut the sides of the ditch. As a matter of special improvement, therefore, means are provided for raising and lowering the beam E during the operation of the buckets, and while the beam is oscillating from side to side, thereby making it possible to trim and shape the banks or sides of the ditch in any desired manner, depending upon the way in which the said lateral and up and down movements of the beam are regulated or controlled. For example, and if desired, the lateral movement may cease at about the time the lower end of the beam E begins to rise, and if the lateral motion is not reversed until the beam and buckets again reach the bottom of the ditch, the cross sectional contour of the latter will then be of the character shown in Fig. 5, as the sides of the ditch will be approximately or practically vertical. However, as shown in the drawings and as hereinafter described, the mechanism for producing the lateral movement and the mechanism for producing the up and down movement are so governed or controlled that the ditch will have a flaring cross sectional contour, whereby the sides slope at the desired angle. This, it will be seen is accomplished by continuing the lateral movement of the beam E and bucket i after the lower end of the beam begins to rise, thus causing the beam and buckets to move sidewise at the same time that they are moving upward.

Figure 11:
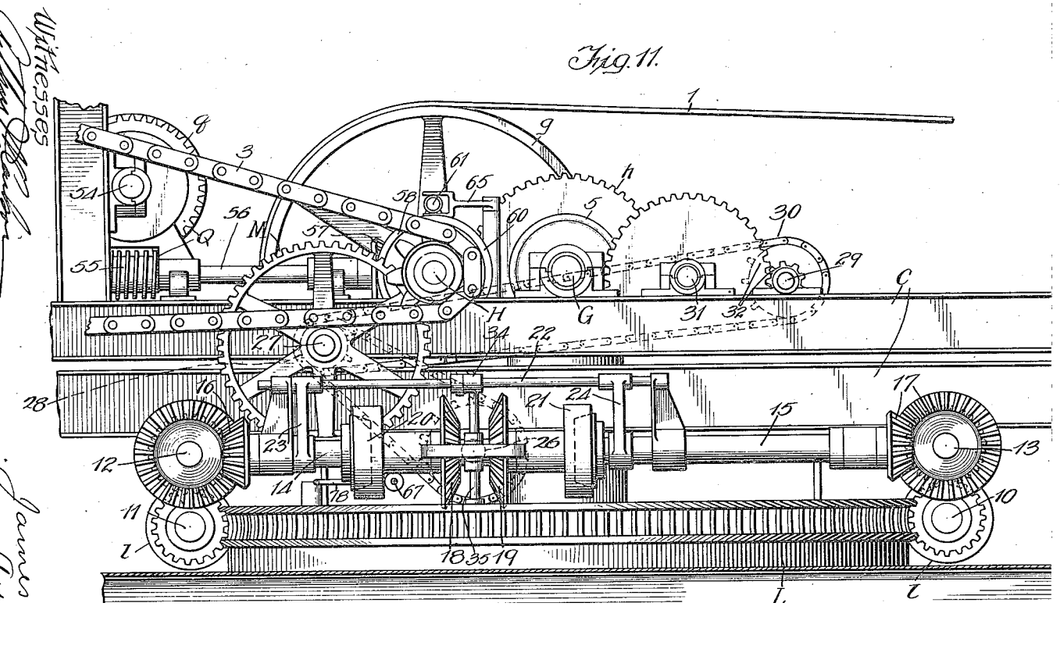
Fig. 11 is a sectional view showing some of the devices and elements in side elevation, the section being taken on line 11—11 in Fig. 6.

The mechanism for causing the body C to oscillate about a vertical axis can be of any suitable known or approved character, and for example may be as follows:

The frame a is provided with a track 6, and the body C is provided with an inverted track 7, rollers 8 journaled on a ring 9 being interposed between said tracks. A ring L, which is in the form of a worm wheel, is secured to the top of the frame a, and screw threaded cylinders 1 are arranged to engage this ring, thereby forming the worm gearing for oscillating the body C on the turn-table, it being understood that the cylinders $l$ are mounted on shafts 10 and 11 arranged at front and rear of the turn-table, and that these shafts are supported by bearings secured to the body C in any suitable or desired manner. These shafts are gear connected with the upper shafts 12 and 13, which latter are also supported in bearings on the body C and longitudinally alined shafts 14 and 15, connected end to end, are also mounted in suitable bearings on the side of the body C and provided at the front and rear ends thereof with bevel gearings 16 and 17 to connect them with the shafts 12 and 13, whereby rotation of the shaft 14 in one direction and rotation of the shaft 15 in the same direction will operate the worm gearing to oscillate the body C in one direction, and whereby a reversal of the rotation of these shafts 14 and 15 will then oscillate said body in the opposite direction. For the purpose of controlling the rotation of these shafts 14 and 15, bevel gears 18 and 19 are mounted loosely upon the central portion of the shafts, and are connected by sleeves with the outer members of the friction or cone clutches 20 and 21, the inner members of these clutches being splined on said shafts in the usual and well known manner, clutches of this kind being old and well known. A rod 22 is mounted for endwise reciprocation above said shaft sections 14 and 15, and is provided with arms 23 and 24 which are suitably connected to shift the cones or splined members of said clutches. Thus, and when the clutch 20 is closed, by the shifting of the rod 22, the clutch 21 is open and the body C revolves in one direction on the turn-table. The shifting of the rod 22 in the opposite direction will close the clutch 21 and open the clutch 20, thus reversing the rotation of the integrally or otherwise connected shaft sections 14 and 15, whereby the body C will then oscillate or revolve in the other direction. This, it will be seen necessitates the constant driving of the bevel gears 18 and 19 in opposite directions, which is accomplished by a level pinion 25 on the shaft 26, which latter is driven from the shaft 27 through the medium of the two-speed gearing 28 and clutch mechanism therefor, which gearing and clutch for changing the speed may, of course, be of any suitable or well known character. This shaft 27 can be driven in any suitable manner, but the transmission of power thereto, with the arrangement shown in the drawing, includes a power transmitting connection which is as follows: The transverse shaft 29 is mounted in bearings on the body C and connected by a sprocket chain 30 with the shaft 27, as shown in Fig. 11. Another transverse shaft 31 has a gear connection 32 with the shaft 29, and has a pinion 33 at its other end to engage the shaft G previously described; and the spur gearing M connects shaft H with shaft 27, said gearing being loose on the shaft, whereby the shaft composed of sections 14 and 15 is rotated and driven by the engine, and by means of the gearing 28 the speed of said rotation may be changed. This gearing 28 comprises, for example, a sprocket-connection $m$ which is loose on the shaft 27 but rigidly connected with the gearing M, and this sprocket-connection is also loose on the shaft 26. The other sprocket-connection $m^1$ of this gearing 28 is loose on the shaft 26 but fast on the shaft 27, so that transmission of power from the shaft 27 to 26 is through the sprocket-connection $m^1$, and at such time the shaft 26 is running loosely in the sprocket-connection $m$, so that there is no transmission through the gearing M at this time. On the other hand, when the clutch (of any suitable character), of the gearing 28 on the shaft 26 is shifted into engagement with the sprocket-connection $m$, the transmission of power is then through this sprocket-connection and not through the sprocket-connection $m^1$, the latter running loosely on the shaft 26, in a manner that will be readily understood. As the connections $m$ and $m^1$ are of different ratios, it follows that the shaft 26 will be rotated faster by one connection than it will by the other.

To shift the rod 22 automatically, thereby to reverse the motion of the body C when it reaches the desired limit of its movement in either direction, a lever 34 is pivoted at 35, connected at 36 with said rod, and operated by mechanism as follows: A rod 37 is pivotally connected with said lever at 38, the ends of this rod being pivoted on the bell-crank levers 39 and 40, which latter are pivoted on the body C and move therewith. Telescoping connections 41 and 42 are provided in the rod 37, and springs 43 and 44 tend to keep said connections normally expanded. The lever 34 has an end portion 45 for engaging the pivoted hooks or catches 46 and 47, which latter are connected by rods 48 and 49 with the bell-cranks 39 and 40, said rods having lost motion connections 50 and 51, and stationary stops 52 and 53 are arranged to engage the bell-cranks 39 and 40 respectively. When the body C swings in one direction, the bell-crank 39 engages the stop 52, causing a compression of spring 43, and as soon as the lost motion 50 is taken up the catch 46 is disengaged from the portion 45 of the lever 34, thereby allowing the spring 43 to push the rod 37 over toward the bell-crank 40. This opens clutch 21 and closes clutch 20, thereby reversing the rotation of the shaft 14—15, and causing the body C to start back in the opposite direction. When the bell-crank 40 strikes the stop 53 the spring 44 is compressed and the clutch mechanism again reversed in a manner that will be readily understood.

Figure 10:
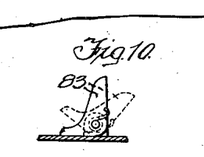
Fig. 10 is a detail of one of the stops for controlling the mechanism for reversing the up-and-down and vertical motion of the digging beam, being an enlarged section on line 10—10 in Fig. 9.
Figure 16:
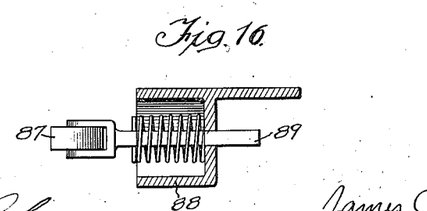
Fig. 16 is an enlarged detail sectional view showing the construction of the spring actuated locking device which is employed for holding open the two clutches which control the raising and lowering or up and down movements of the digging beam and buckets thereon, this device being necessary to prevent any up or down movement of said beam and buckets during the time that they are crossing the flat bottom of the ditch, as will hereinafter more fully appear.

The mechanism or apparatus for automatically raising and lowering the digging beam E and bucket $i$ during the operation of the machine, in order to shape the banks or sides of the ditch, may be of any suitable or desired character. As shown, however, this mechanism may comprise a sheave N mounted on the end of the frame D and a sheave $n$ on the digging beam E, these sheaves having applied thereto a cable O which is arranged for raising and lowering the said digging beam and buckets. A winding drum P is provided on the body C for operating said cable, it being understood that the said cable may be arranged upon the said sheave and drum in any suitable or desired manner. As shown, the arrangement includes a pair of the sheaves N and a pair of the sheaves $n$, and the said drum has two sections for winding thereon the two end portions of said cable. To obtain a connection having sufficient lifting power, the cable O may extend twice around the sheaves N and $n$, after leaving the winding drum mechanism, and the middle portion of the cable can then extend upward and over sheaves $o$ on the sprocket shaft $e$, and then around the sheaves $p$ suitably mounted on the frame or the body, whereby the cable extends at each side of the digging beam and does not interfere with the free travel of the buckets. In this way, the sheaves $p$ engage the equalizing portion of the cable, so that this portion is maintained at a fixed height and does not move up and down with the digging beam and excavating buckets when the cable is operated to either raise or lower the excavating apparatus. The raising strain on the apparatus is equalized, by this arrangement of the cable, but the equalization is brought about by a reaction of the hoisting strain on the body of the excavator, instead of by a direct pulling action on the excavating apparatus; for, as explained, the equalizing sheaves $p$ are on the body of the excavator, in front of the excavating apparatus, and thus have a stationary position during the raising and lowering movements of the excavating apparatus. For operating the drum P a worm gearing Q is provided, this gearing consisting of a worm wheel $q$ on the shaft 54 of the winding drum mechanism, and a worm or screw threaded cylinder 55 on the longitudinal shaft 56, the latter being provided at its end with a bevel pinion 57 for engaging the bevel gears 58 on the shaft H, these bevel gears being both loose on said shaft. This shaft H is provided with clutches 59 and 60, similar to those previously described, whereby either one of the two bevel gears 58 can be locked to the shaft H, and whereby the shaft 56 can be rotated in either direction. A rod 61 is mounted for endwise movement above the shaft H, and is provided with arms 62 and 63 for shifting the splined members of the clutches 59 and 60, respectively, and this rod 61 is operated endwise by a vertically disposed rock shaft 64, all of which elements, as will be understood, are suitably mounted upon the oscillating body of the machine. Said rock shaft 64 is provided at its upper end with an arm 65 which is pivotally or otherwise suitably connected with the rod 61 and has its lower end provided with an arm 66 which is pivoted at its forward end on the transversely arranged and endwise movable rod 67, the latter having telescoping connections 68 and 69 near the ends thereof. Springs 70 and 71 are applied to said telescoping connections, and the opposite ends of this rod 67 are pivoted on the bell-cranks 72 and 73, which latter are pivoted on the oscillating body of the machine. The pivoted catches 74 and 75 are provided with hooks for engaging the pin 76 on the end of the arm 66, and are connected by rods 77 and 78 with the bell-cranks 72 and 73 respectively, each rod having a lost motion connection 79 similar to those previously described. Stationary stops 80 and 81 are arranged to engage the opposite arms of the bell-crank 73, and stationary stops 82, 83, 84 and 85 are arranged for engaging the arms of the bell-crank 72, each of these four stops being of the kind shown in Fig. 10, and having pivotal action as will hereinafter more fully appear. A stationary cam track 86 is arranged to engage the roller 87 of the locking device 88, which device has an endwise movable projection 89 for engaging the finger 76, this projection 89 and the roller 87 being actuated by a spring (see Fig. 16) as soon as the said roller disengages the cam track 86 at either end thereof. It will be understood, of course, that the device 88 is supported by and travels with the oscillating body.

Figure 12:
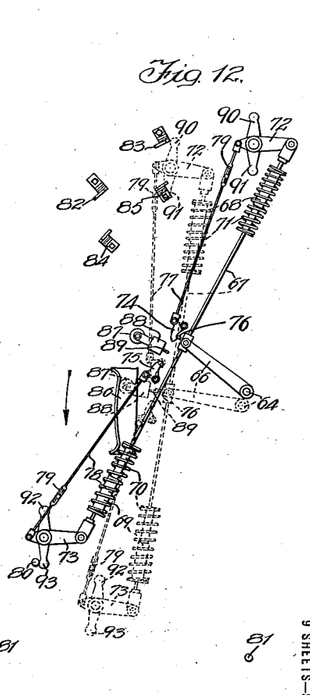
Figs. 12, 13, 14 and 15 are diagrammatic views showing the different positions of the mechanism for controlling and reversing the up and down movement of the digging beam.
Figure 13:
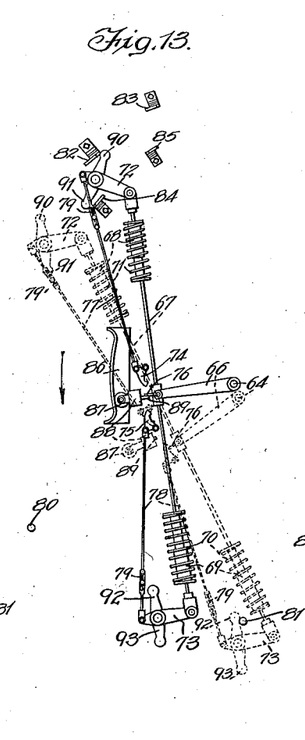
Figures 14, 15:
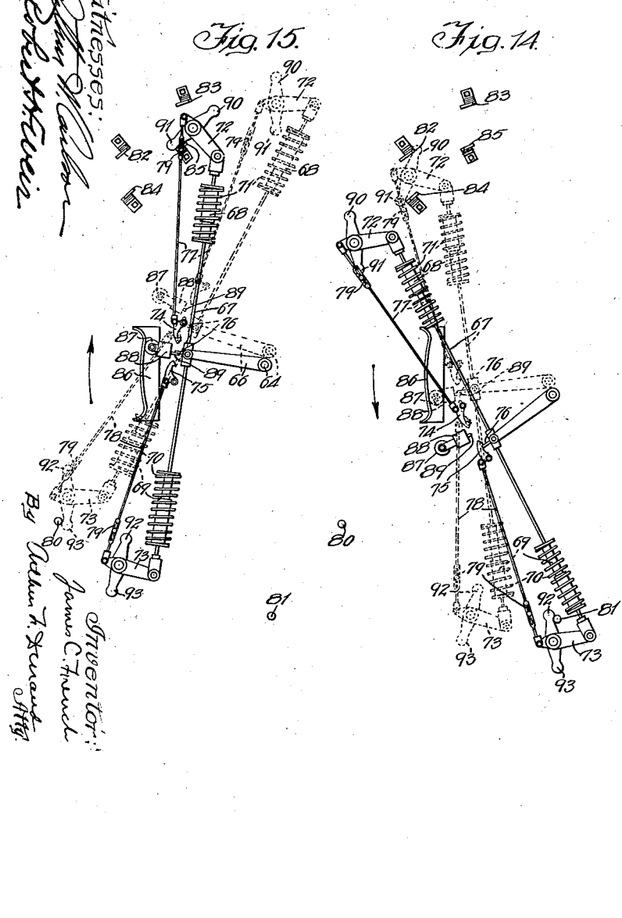

With the construction shown and described, the operation of the mechanism for automatically reversing the up and down motion of the beam and buckets is as follows: Assuming that the body C has swung over to the limit of its movement in one direction, and is now returning in the opposite direction, as indicated by the arrow in Fig. 12, the arm 90 of the bell-crank 72 will strike stop 83, as shown in dotted lines, thereby compressing spring 71 and releasing catch 74 from finger 76, allowing rod 67 to shift endwise until projection 76 engages the projection 89, as also shown in dotted lines. Arm 91 will pass stop 85, as the latter will tilt over, (see Fig. 10), but stop 83 can only tilt over in the other direction and will actuate the mechanism as stated. This opens both clutches 59 and 60 and stops the downward movement of the beam E and buckets, thereby permitting the digging apparatus to cross the bottom of the ditch. When the other side of the bottom is reached, the parts are then in the position shown in full lines in Fig. 13, and arm 90 strikes stop 82, whereby this bell-crank 72 is turned farther around on its pivot, it being understood that the stop 83 is so located that it only partially rotates this bell-crank. As shown in Fig. 13, therefore, spring 71 is again compressed, and as soon as roller 87 disengages the camtrack 86 the projection 89 is moved thereby to disengage the finger 76, thus allowing the catch 75 to engage the finger 76 to hold the rod 67 in its shifted position. This, of course, opens clutch 60 and closes clutch 59, causing the beam E and buckets to start upward. This upward movement continues until the upper edge of the ditch is reached, at which time the parts then assume the position shown in dotted lines in Fig. 13, or in full lines in Fig. 14, as the arm 92 of bell-crank 73 finally strikes the stop 81 to compress spring 70 and disengage catch 75 from finger 76 of the clutch lever. This permits rod 67 to shift endwise until finger 76 engages catch 74, thereby opening clutch 59 and closing clutch 60 at about the time the motion of the body C is released in the manner previously described. This continues until arm 91 strikes stop 84, which compresses spring 70, the buckets now having reached the bottom of the ditch, and catch 74 disengages finger 76 and permits the latter to engage the projection 89 as shown in dotted lines in Fig. 14, thus holding both clutches open. Stop 82 permits arm 90 to pass without actuating bell-crank 72, and when the buckets about reach the other side of the bottom arm 91 then strikes stop 85, and is actuated thereby, as shown in full lines in Fig. 15, thus compressing spring 71 again. When roller 87 disengages the cam track 86, the finger 76 is released by the projection 89, thus allowing rod 67 to shift endwise until finger 76 engages catch 75, thus opening clutch 60 and closing clutch 59 to start the beam E and buckets upward. At about the time the body C reaches the limit of its movement in this direction, and is reversed, the arm 93 strikes stop 80 to return the parts to the position shown in full lines in Fig. 12, and in dotted lines in Fig. 15, thus starting the beam E and buckets downward again.

From the foregoing it will be seen that the digging beam E is controlled in such manner that the buckets move upward and outward at the same time, after reaching one side of the bottom of the ditch, thereby providing the ditch with inclined sides. When the digging beam and its buckets reach the limit of their lateral movement, both motions are then reversed, whereby the buckets then move downward at the same time that they are moving toward the farther side of the ditch. When the buckets $i$ reach the bottom of the ditch, the downward movement thereof is then discontinued, thereby permitting the beam and its buckets to move straight across the bottom of the ditch to provide a flat bottom surface, or surface which is approximately flat. When the buckets reach the farther side of the ditch the clutches which control the raising and lowering mechanism are then controlled to start the buckets upward, and this upward movement continues until the limit of the lateral motion is reached at this side of the ditch. The result, therefore, is a ditch which in cross sectional contour is like the one shown in Fig. 3, but it will be understood that the up and down and lateral movements of the digging beam E can be controlled or regulated to give the sides of the ditch any desired slope or angle, depending upon the requirements and conditions.

Furthermore, it is also possible, by properly regulating or controlling the said up and down and lateral movements of the digging beam E, as by causing the lateral movement to cease as soon as the buckets begin moving upward, to produce a ditch or trench having vertical sides. (See Fig. 5.) Ordinarily, and with only the lateral movement of the buckets, a ditch or trench of the kind shown in Fig. 4 would be made as the angle of the beam E would, when the beam is swung to one side, show its effect on the sides of the trench, causing the buckets to undercut the sides and produce an overhang. With the provision of the means for automatically raising and lowering the beam E and its buckets, in the manner described, the overhang which would naturally result from the lateral movement may be cut away or obliterated to provide exactly vertical sides, as shown in Fig. 5, or the beam may be controlled to produce angular or inclined sides if such are desired or necessary.

By dispensing with the devices shown in Figs. 12, 13, 14 and 15, it is obvious that the clutches 59 and 60 could be operated by hand, in any suitable manner, thus manually controlling the up-and-down motion of the digging apparatus.

From the foregoing it will be seen that either a trench or an open ditch can be made. In other words, the machine can be used as an ordinary trenching machine, for making a trench having vertical sides, or it can be used for making an open ditch having sloping sides.

For the broader purposes of my invention, the mechanism for raising and lowering the buckets and the beam on which the buckets are mounted, during the operation of said buckets, may be governed or controlled in any suitable or desired manner. As shown and described, and as more particularly illustrated in Figs. 12, 13, 14 and 15, this gradual raising and lowering of the beam E is entirely automatic, inasmuch as the winding drums P are automatically started and stopped and reversed by the oscillation of the body of the machine. In other words, the clutches 59 and 60 are operated automatically to start and stop and reverse the rotation of the pinion 57 and shaft 56 through which the worm gearing Q is driven to rotate the said winding drums. Obviously, however, these clutches 59 and 60 can be controlled by any suitable known or approved devices, when it is desired to automatically or otherwise govern the raising and lowering of the buckets while the latter are traveling around the beam; and the sides of the ditch or trench can be given any suitable or desired shape or angle without stopping the machine to readjust the mechanism. Also, and with the construction shown and described, the arrangement of the cable O around the sheaves $p$ serves to equalize the strain on said cable, and on the two opposite sides of the digging means E, whereby the lifting strain is always equalized on the two sheaves $n$ (previously described) regardless of the swerving of the beam to one side or the other. The shaft $e$ holds the beam E in substantially a vertical plane, but while the machine is oscillating to one side or the other it will be understood that the side thrust on the lower end of the beam is necessarily considerable, and that even with a very rigid structure there may be some slight swerving or yielding; and that in such case the beam will swerve a little from one side to the other, relative to the body frame of the machine, during the operation of digging the trench. This, however, will not interfere with the proper operation of the mechanism for raising and lowering the beam, and the strain or pull on the two drums P will always be substantially the same.

It will be understood, of course, that with the foregoing construction and mode of operation the beam E must be equipped with something more than merely a device for raising it out of the ditch after the latter is completed, or when it is desired to change the position of the machine. In other words, for the purpose and mode of operation described, the beam E must be equipped with a very powerful apparatus for raising it, for the reason that it is not only quite heavy and must be raised and lowered in the ordinary way, but for the further reason that it is required to move up and down during the operation of the buckets, and if desired during the oscillating or sidewise motion of the beam. Again, the apparatus for raising the beam E must be of a character to lift upwardly at opposite sides thereof, so as to prevent twisting motion of the beam during the lifting thereof. Therefore, the apparatus for lifting the beam preferably involves the said cable O which extends a plurality of times around the sheaves N and $n$ at opposite sides of the beam, and a worm-gear-operated winding-drum-mechanism for winding up the said cable to lift the beam and buckets. Equalizing sheaves $p$ are preferably employed, as stated, to equalize the strain on the opposite sides of the digging beam during the lifting thereof.

What I claim as my invention is:—

1. An excavator for making a ditch, comprising a digging apparatus, means to operate said apparatus, devices for moving the excavator forward in the direction of the ditch during the operation of said apparatus, instrumentalities having motion-reversing elements to give said apparatus a back-and-forth lateral movement from one side of the ditch to the other, during the operation thereof, about a vertical axis disposed a distance ahead of said apparatus, and mechanism for automatically raising said apparatus in operation and while moving laterally at each side of the ditch to slope the opposite sides thereof and for lowering the digging apparatus to maximum depth while returning toward the center of the ditch after each reversal of said lateral movement.

2. A structure as specified in claim 1, said apparatus comprising a beam having an endless series of trench-cutting buckets supported thereon, and the upper end of said beam being pivoted to provide a horizontal axis for said raising and lowering motion of the digging apparatus.

3. A structure as specified in claim 1, said apparatus being disposed at the rear end of the excavator, and said devices traveling on the ground ahead of said apparatus.

4. A structure as specified in claim 1, said lateral movement being about a vertical axis.

5. A structure as specified in claim 1, said apparatus comprising a beam having an endless series of trench-cutting buckets supported thereon, and the upper end of said beam being pivoted to provide a horizontal axis for said raising and lowering motion of the digging apparatus, said lateral movement being about a vertical axis.

6. A structure as specified in claim 1, said mechanism including means to hold said apparatus at a fixed depth in the ground while crossing the bottom of the ditch.

7. An excavator for making a ditch, comprising a digging apparatus, means to operate said apparatus, devices for moving the excavator forward in the direction of the ditch during the operation of said apparatus, instrumentalities having motion-reversing elements to give said apparatus a back-and-forth lateral movement from one side of the ditch to the other during the operation thereof about a vertical axis disposed a distance ahead of said apparatus, and mechanism for automatically raising said apparatus in operation and while moving laterally against each side of the ditch during the operation thereof, to slope the sides of the ditch, said instrumentalities including a turn-table carried by said devices and an oscillating body mounted on said turn-table to support said apparatus in rear thereof, a power plant mounted on said body to operate said means and devices, and means associated with said turn-table to automatically reverse the movement of said body.

8. An excavator for making a ditch, comprising a digging apparatus, means to operate said apparatus, devices for moving the excavator forward in the direction of the ditch during the operation of said apparatus, instrumentalities having motion-reversing elements to give said apparatus a back-and-forth lateral movement from one side of the ditch to the other during the operation thereof about a vertical axis disposed a distance ahead of said apparatus, and mechanism for automatically raising said apparatus in operation and while moving laterally against each side of the ditch during the operation thereof, to slope the sides of the ditch, said instrumentalities including an oscillating body having said apparatus disposed in rear thereof, a power plant mounted on said body to operate said means and devices, and said mechanism including means arranged below and operated by said body to automatically start the upward movement of said apparatus while the latter is moving laterally at each side of the ditch.

9. An excavator for making a ditch, comprising a digging apparatus, means to operate said apparatus, devices for moving the excavator forward in the direction of the ditch during the operation of said apparatus, instrumentalities having motion-reversing elements to give said apparatus a back-and-forth lateral movement from one side of the ditch to the other during the operation thereof about a vertical axis disposed a distance ahead of said apparatus, and mechanism for automatically raising said apparatus in operation and while moving laterally against each side of the ditch during the operation thereof, to slope the sides of the ditch, a power plant mounted to oscillate with said apparatus and connected to operate said means and devices, said mechanism being operative to automatically raise said apparatus while the latter is moving outward at each side of the ditch.

10. An excavator for making a ditch, comprising a digging apparatus, means to operate said apparatus, devices for moving the excavator forward in the direction of the ditch during the operation of said apparatus, instrumentalities having motion-reversing elements to give said apparatus a back-and-forth lateral movement from one side of the ditch to the other during the operation thereof about a vertical axis disposed a distance ahead of said apparatus, and mechanism for automatically raising said apparatus in operation and while moving laterally against each side of the ditch during the operation thereof, to slope the sides of the ditch, said instrumentalities including an oscillating body having a rearwardly overhanging rigid frame to provide a support for the upper end of said apparatus, a power plant mounted on said body to operate said means and devices, and said mechanism including sheaves on said frame and a cable to engage said sheaves, arranged to swing said apparatus in a vertical plane.

11. In an excavator for making a ditch, the combination of a digging apparatus, means to operate said apparatus, devices for moving the excavator forward in the direction of the ditch during the operation of said apparatus, to cut a trench behind the excavator, instrumentalities to give said apparatus a back-and-forth lateral movement from one side of the ditch to the other during the operation thereof in the ground, to widen said trench, mechanism for raising and lowering said apparatus against each side of the trench, during the operation thereof, thereby to form the sides of the ditch, and means to control said instrumentalities and mechanism and whereby each lateral movement automatically terminates in upward movement of said apparatus against one side of the ditch.

12. A structure as specified in claim 11, said apparatus comprising a beam having an endless series of trench-cutting buckets supported thereon, and the upper end of said beam being pivoted to provide a horizontal axis for said raising and lowering motion of the digging apparatus.

13. A structure as specified in claim 11, said apparatus being disposed at the rear end of the excavator, and said devices traveling on the ground ahead of said apparatus.

14. A structure as specified in claim 11, said mechanism including a winding drum and cable connected to said apparatus and clutches automatically controlled to reverse the rotation of said drum at each side of the ditch.

15. A structure as specified in claim 11, said apparatus comprising a beam having an endless series of trench-cutting buckets supported thereon, and the upper end of said beam being pivoted to provide a horizontal axis for said raising and lowering motion of the digging apparatus, said mechanism including a winding drum and cable connected to said apparatus and clutches automatically controlled to reverse the rotation of said drum at each side of the ditch.

16. A structure as specified in claim 11, said apparatus being disposed at the rear end of the excavator, and said devices traveling on the ground ahead of said apparatus, said mechanism including a winding drum and cable connected to said apparatus and clutches automatically controlled to reverse the rotation of said drum at each side of the ditch.

17. A structure as specified in claim 11, said mechanism including sheaves and a cable arranged to equalize the raising strain at opposite sides of said apparatus, one or more of said sheaves being mounted to support the equalizing portion of said cable at a fixed height while the apparatus is being raised or lowered.

18. A structure as specified in claim 11, said apparatus comprising a beam having an endless series of trench-cutting buckets supported thereon, and a body frame, the upper end of said beam being pivoted on said body frame to provide a transverse axis for said raising and lowering motion of the digging apparatus, and said mechanism including sheaves and a cable arranged to equalize the raising strain at opposite sides of said apparatus, and means on said axis to support the equalizing portion of said cable.

19. A structure as specified in claim 11, said apparatus being disposed at the rear end of the excavator, and said devices traveling on the ground ahead of said apparatus, said mechanism including sheaves and a cable arranged to equalize the raising strain at opposite sides of said apparatus, one or more of said sheaves being disposed on the excavator body in front of said apparatus to engage the equalizing portion of the cable.

20. In an excavator for making trenches, the combination of digging means, mechanism to move said means forward in the ground, power-transmitting connections to operate said means while moving forward, devices to move said means up and down about a horizontal axis and laterally about a vertical axis, while in operation, with said means inclined forward, and instrumentalities to automatically govern the up and down and lateral movements of said means.

21. A structure as specified in claim 20, said mechanism including a vertical driving shaft coincident with said vertical axis, and means oscillatory about said vertical axis to operate said shaft.

22. A structure as specified in claim 20, said vertical axis being disposed a distance in front of said digging means, and said horizontal axis being disposed a distance above the ground in rear of said vertical axis, the angle and inclination of said digging means being variable about said horizontal axis.

Signed by me at Chicago, Illinois, this 22nd day of June, 1915.

JAMES C. FRENCH.